United States Patent [19]

Schindewolf

[11] 3,945,919

[45] Mar. 23, 1976

[54] PROCESS FOR THE ENVIRONMENTALLY FAVORABLE DESTRUCTION OF SOLID AND/OR LIQUID CYANIDE WASTE

[75] Inventor: Ulrich Schindewolf, Reichenbach, Germany

[73] Assignee: Deutsche Gold- und Silber-Scheideanstalt vormals Roessler, Germany

[22] Filed: Aug. 2, 1972

[21] Appl. No.: 277,284

[30] Foreign Application Priority Data
Aug. 18, 1971   Germany............................ 2141294

[52] U.S. Cl. ............... 210/50; 210/56; 210/DIG. 26
[51] Int. Cl.² ........................ C02B 1/02; C02C 5/00
[58] Field of Search .... 210/50, 56, 59, 63, DIG. 26, 210/48

[56] References Cited
UNITED STATES PATENTS

| | | | |
|---|---|---|---|
| 2,194,438 | 3/1940 | Wernlund et al. ..................... | 210/56 |
| 2,261,921 | 11/1941 | Pittman et al. .................... | 210/59 X |
| 2,459,464 | 1/1949 | Smith................................. | 210/63 X |
| 3,505,217 | 4/1970 | Morico ................. | 210/59 |
| 3,617,567 | 11/1971 | Mathre ................. | 210/50 |
| 3,650,949 | 3/1972 | Hager ................. | 210/63 X |
| 3,697,421 | 10/1972 | Lauria et al. ......................... | 210/59 |
| 3,772,194 | 11/1973 | Baden.......................... | 210/DIG. 26 |

OTHER PUBLICATIONS

Williams, H. E., *Cyanogen Compounds*, Edward Arnold & Co., London, 2nd Edition, 1948, pp. 153, 154, 158.

*Primary Examiner*—Thomas G. Wyse
*Attorney, Agent, or Firm*—Cushman, Darby & Cushman

[57] ABSTRACT

Solid and/or liquid cyanide waste is destroyed under environmentally favorable conditions by adding water to the cyanide and heating the mixture at high temperature and with the use of pressure.

7 Claims, No Drawings

PROCESS FOR THE ENVIRONMENTALLY FAVORABLE DESTRUCTION OF SOLID AND/OR LIQUID CYANIDE WASTE

The invention is directed to a process for the destruction of solid and/or liquid cyanide wastes under environmentally favorable, i.e., non-polluting conditions.

This process is of importance since the depositing of cyanide containing waste causes increasingly greater difficulties because of the extraordinarily poisonous nature of the material and the accompanying environmental danger.

To avoid the environmental dangers the cyanide must be made innocuous by chemical means. At present the destruction is accomplished by burning at above 1500°C. or by catalytic oxidation at above 400°C. In a wet process the cyanide is detoxicated by reaction with ferrous sulfate.

The first process has the disadvantages of possible formation of poisonous carbon monoxide and nitrous gases, apart from the short life span of the high temperature furnace. In the second process the sensitivity to poisoning of the catalysts is disadvantageous.

In the third process there are always eventually formed problem causing iron cyanide which likewise must be controllably deposited because of possible environmental pollution.

Because of the disadvantages mentioned the destruction of the cyanide is a financially very expensive process.

The object of the invention is the development of a cheap process which leads to non-toxic residues under mild conditions which does not cause any danger to the environment. It has long been known to destroy hydrocyanic acid with water to form ammonia and formic acid.

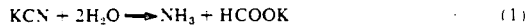

$$KCN + 2H_2O \rightarrow NH_3 + HCOOK \qquad (1)$$

This reaction, however, is extraordinarily slow and at normal pressure in a boiling water solution only takes place with a speed which is not sufficient for the destruction of cyanides on an industrial scale. For example, the complete conversion of 1 gram of KCN in 100 ml. of water takes several hours when carried out according to reaction (1).

The problem on which the invention is based is to permit reaction (1) to take place in an industrially productive manner. This problem has been solved in a surprisingly simple manner by adding water to cyanide, so far as it is not present in aqueous solution and the mixture or solution is heated to high temperatures while using pressure. Thus there can be used 1 to 1000 parts of water per part of cyanide. The pressure should be from 5 to 100 atmospheres above normal atmospheric pressure.

As the cyanide waste there can be used for example alkali metal cyanides, e.g., sodium cyanide, potassium cyanide and lithium cyanide, calcium cyanide, zinc cyanide and silver cyanide wastes or even hydrocyanic acid.

The reaction is usually carried out at a temperature of 120° to 200°C., preferably at 140° to 180°C. While it is not essential to employ a catalyst preferably there are added salts of one or more transition metals, preferably iron, cobalt or nickel as catalysts. Examples of such salts are ferrous chloride, ferric chloride, ferrous bromide, ferric bromide, ferrous sulfate, ferric sulfate, ferrous nitrate, ferric nitrate, cobaltous chloride, cobaltic chloride, cobaltous bromide, cobaltous nitrate, cobaltous sulfate, nickelous bromide, nickelous chloride, nickelous nitrate and nickelous sulfate.

The catalyst is usually used in an amount of 0 to 5 parts per 100 parts of cyanide. It is also desirable to remove the ammonia formed in the reaction as a gas from the reaction zone.

Advantages of the process of the invention are:
1. The reaction is carried out under mild conditions.
2. The fact that the reaction is carried out in a homogenous liquid phase while at the same time the process can take place continuously in a simple manner in a pressure tube.
3. No poisonous waste products are formed which can contribute to the poisoning of the environment or which must be deposited by expensive modes of action.
4. The salts left behind accumulate in a highly concentrated form and therefore can be easily drawn off.
5. The energy costs are very low and the apparatus is inexpensive.

Unless otherwise indicated all parts and percentages are by weight.

The following example illustrates the invention but is not intended to limit it.

EXAMPLE 1

1 kilogram of sodium cyanide was heated to about 160°C. with 1 liter of water in a pressure vessel in the presence of several grams of a cobalt salt, specifically cobalt chloride, bromide or sulfide. The pressure in the vessel at the start of the reaction was about 1 atmosphere. Inside of a few minutes after reaching the stated temperature reaction (1) occurred vigorously. The progress of the reaction was observed by the increase in pressure which indicated the setting free of ammonia. Within 1 hour 99.9996% of the cyanide was destroyed.

By withdrawing the ammonia from the pressure vessel it is also possible to carry out the complete reaction with only a slight excess of water. The reaction residue, sodium formate, is a liquid at the temperatures employed, however, it solidified upon cooling.

Without the use of a catalyst the reaction is somewhat slower but is just as complete.

Thus it is possible to change the highly poisonous cyanide into ammonia and a salt of formic acid.

The procedure is carried out while the water is present as a liquid.

EXAMPLE 2

1 G of potassium cyanide in 1 l of water was heated in the pressure vessel to 200°C. The reaction was followed by sampling and chemical analysis. Within ten minutes the cyanide content of the solution was below the limit of detection, i.e. below 0.1 mg / l.

What is claimed is:

1. A process for destroying liquid or solid cyanide waste under environmentally favorable conditions consisting essentially of providing the cyanide with water in the presence of a salt of a transition metal as a catalyst and heating the aqueous mixture to a temperature of 120° to 200°C. at superatmospheric pressure to form ammonia and formic acid or a salt thereof.

2. A process according to claim 1 wherein the cyanide waste comprises a cyanide salt.

3. A process according to claim 2 wherein the salt is an alkali cyanide.

4. A process according to claim 2 wherein the salt is sodium cyanide.

5. A process according to claim 1 wherein the temperature is 140° to 180°C.

6. A process according to claim 1 wherein the metal is iron, cobalt or nickel.

7. A process according to claim 1 wherein the ammonia formed in the reaction is removed from the reaction zone as a gas.

* * * * *